United States Patent [19]

Chen

[11] Patent Number: 5,136,802

[45] Date of Patent: Aug. 11, 1992

[54] MOSQUITO-KILLING FAN ILLUMINATED WITH FLUORESCENT LAMP

[76] Inventor: Chih-Ming Chen, c/o Hung Hsing Patent Service Center P.O. Box 55-1670, Taipei (10477), Taiwan

[21] Appl. No.: 712,699

[22] Filed: Jun. 10, 1991

[51] Int. Cl.⁵ .............................................. A01M 1/10
[52] U.S. Cl. .................................................... 43/111
[58] Field of Search ........................... 43/113, 107, 111

[56] References Cited

U.S. PATENT DOCUMENTS

| | | | |
|---|---|---|---|
| 1,819,551 | 8/1931 | Gourdon | 43/113 |
| 3,987,578 | 10/1976 | Rueff | 43/113 |
| 4,603,505 | 8/1986 | Millard | 43/113 |
| 4,989,291 | 2/1991 | Parent | 15/321 |
| 5,014,460 | 5/1991 | Patti et al. | 43/107 |

Primary Examiner—Richard K. Seidel
Assistant Examiner—James Miner

[57] ABSTRACT

A mosquito-killing fan includes: a mosquito catcher rotated in a direction opposite to a rotating direction of an air fan rotatably driven by a driving motor mounted in a casing. A fluorescent lamp is secured in a bottom portion of the casing. An air stream is drafted inwardly for sucking mosquitoes flying in the air stream so as to be caught by the mosquito catcher. The mosquitoes will be killed after being impacted against the catcher by the air stream. A mosquito killing device is thus provided which prevents the hazard of an electrical shock.

1 Claim, 3 Drawing Sheets

MOSQUITO-KILLING FAN ILLUMINATED WITH FLUORESCENT LAMP

BACKGROUND OF THE INVENTION

A conventional mosquito-killing lamp includes a fluorescent lamp having a net conducted with a high tension or high frequency current disposed around the fluorescent lamp for killing mosquitoes flying towards the lamp by electric shock caused on the net. Even the electric current may be designed to be low ampere, which is still dangerous and hazardous, especially for a kid or baby.

It is therefore expected to disclose a mosquito killing device for preventing an electrical shock accident.

SUMMARY OF THE INVENTION

The object of the present invention is to provide a mosquito-killing fan including: a mosquito catcher rotated in a direction opposite to a rotating direction of an air fan rotatably driven by a driving motor mounted in a casing having a fluorescent lamp secured in a bottom portion of the casing for drafting air stream inwardly also for sucking mosquitoes flying in the air stream to be caught by the mosquito catcher, so that a plurality of mosquitoes will be caught into the mosquito catcher and be going to die after being impacted by the catcher and by the air stream, thereby providing a mosquito-killing method without causing electric shock accident hazardous to humanbeing.

DETAILED DESCRIPTION

Figures 1, 2:
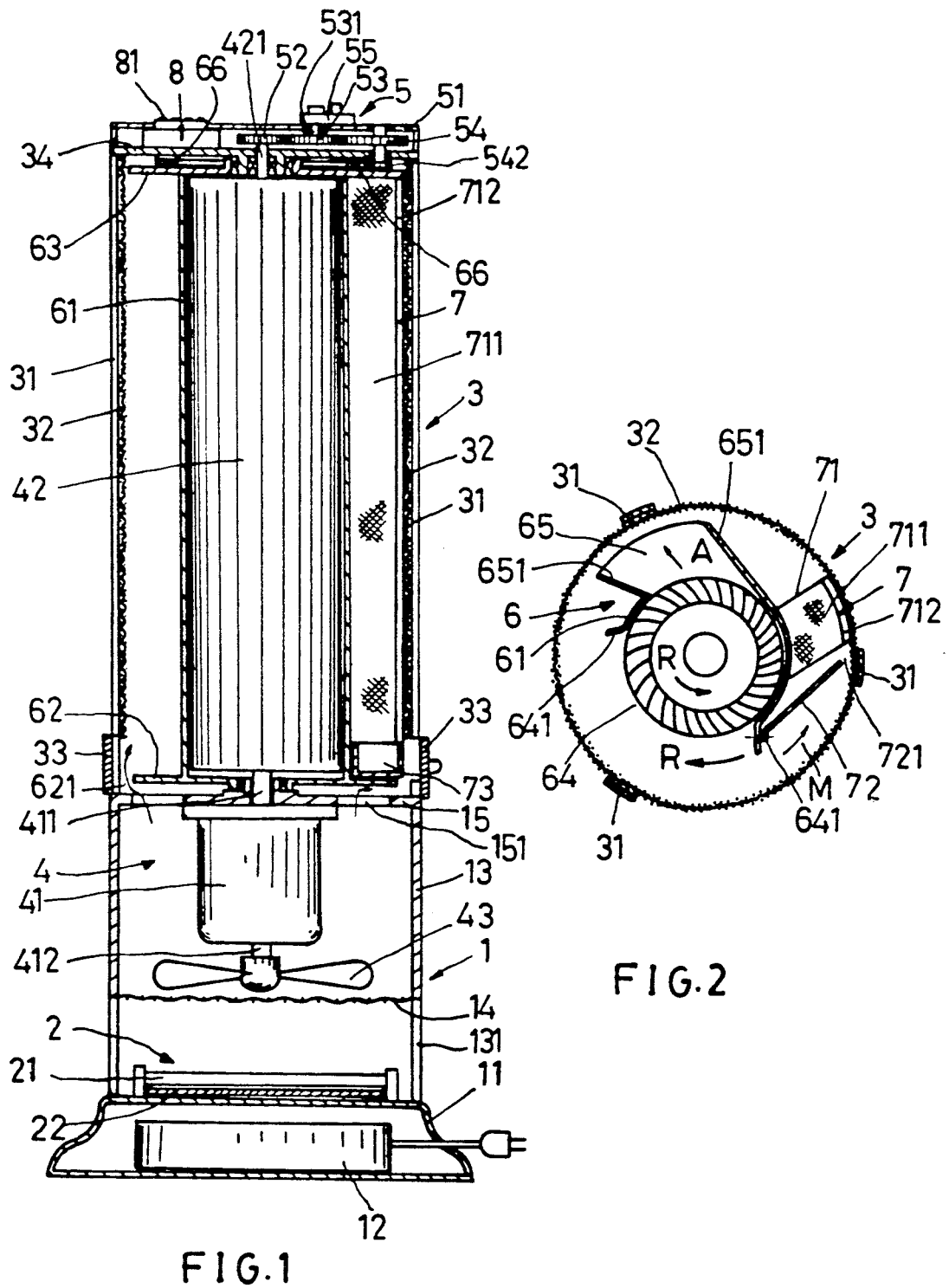
FIG. 1 is an elevational sectional drawing of the present invention.
FIG. 2 is a top view sectional drawing of the present invention.
Figure 3:
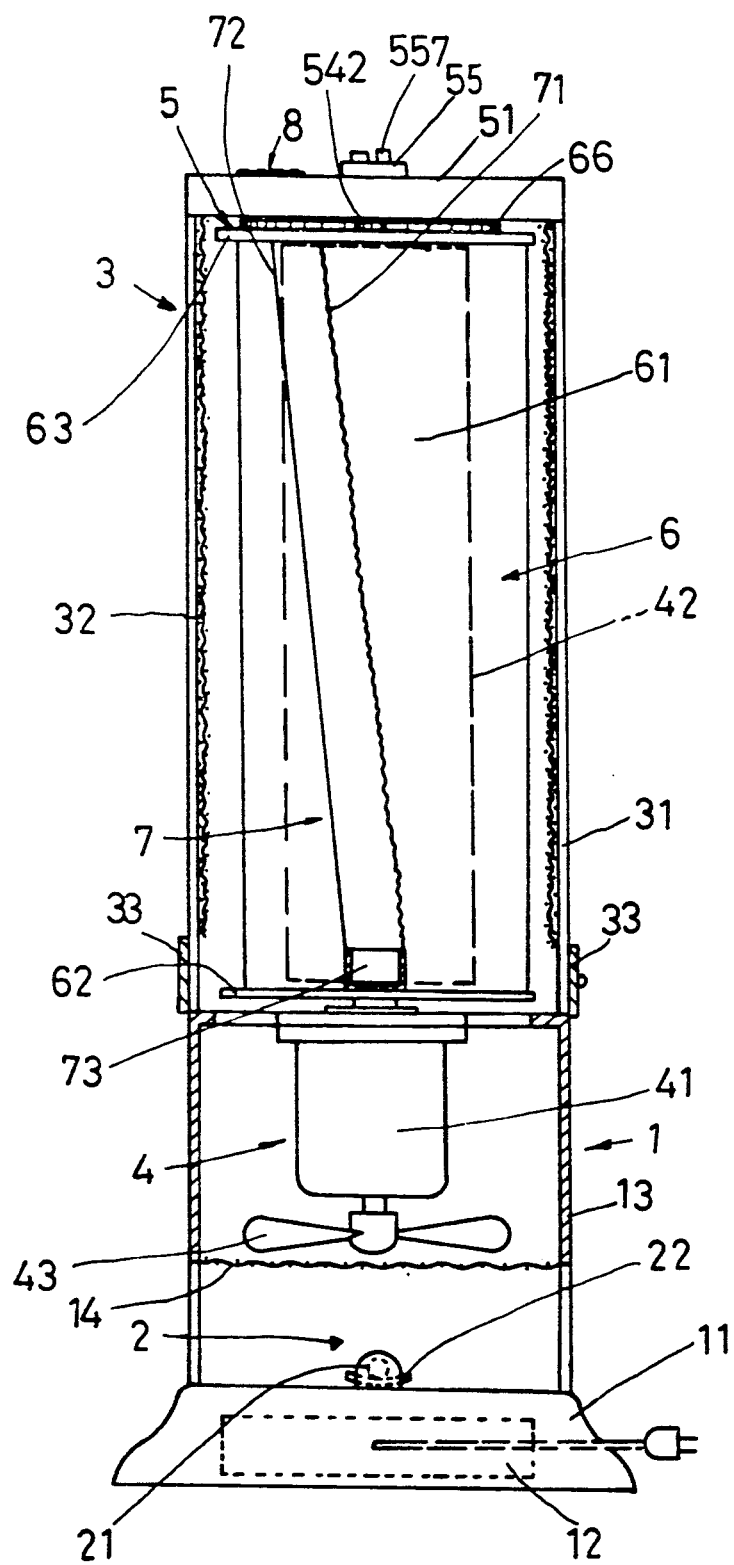
FIG. 3 is a side view sectional drawing of the present invention as shown in FIG. 1.

As shown in FIGS. 1-4, the present invention comprises: a lower casing 1, a fluorescent lamp 2, an upper casing 3, an air fan means 4, a transmission gear set 5, an air guiding funnel 6, a mosquito catcher 7 and a switch means 8.

The lower casing 1 includes: a base portion 11 having an extension cord 12 of power source windably held on the base portion 11, a side wall portion 13 disposed around the base portion 11 having a plurality of inlet holes 131 formed in the side wall portion 13 and a lower net 14 surrounding the side wall portion 13 having coarse mesh allowing an inward flying of mosquito but precluding an intrusion of a human finger, and a partition plate 15 formed on an upper portion of the lower casing 1 for partitioning the upper casing 3 positioned above the lower casing 1 and formed with a plurality of air through holes 151 in the plate 15 fluidically communicated with the upper casing 3.

The fluorescent lamp 2 is provided with a light reflector 22 positioned under a fluorescent lamp tube 21 for reflecting fluorescent lights divergently to attract the mosquitoes flying into the present invention.

The upper casing 3 includes: a plurality of supporting columns 31 vertically juxtapositionally secured between an upper plate 34 formed on an upper portion of the upper casing 3 and the partition plate 15, a lower door 33 formed on a lower portion of the upper casing 3 openable for cleaning purpose, and an upper net 32 with fine mesh disposed around the supporting columns 31 of the upper casing 3.

The air fan means 4 includes an axial-flow fan 43 formed in the lower casing 1 and secured to a lower shaft 412 of a driving motor 41 secured in the lower casing 1, and a radial-flow fan 42 secured to an upper shaft 411 of the driving motor 41 rotatably mounted in the partition plate 15 of the lower casing 1 having an upper central shaft portion 421 rotatably secured in the upper plate 34 of the upper casing 3.

Figures 4, 5:
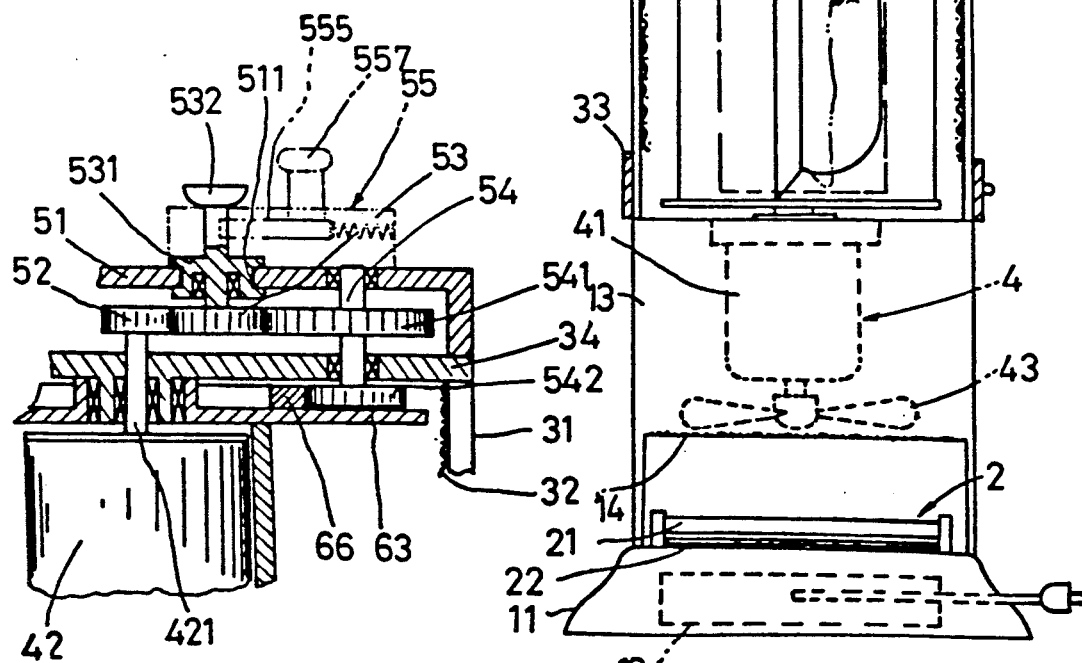
FIG. 4 shows a driving mechanism in accordance with the present invention.
FIG. 5 is an elevational sectional drawing of another preferred embodiment of the present invention.

The transmission gear set 5 as shown in FIGS. 1, 4 includes: an upper cover 51 secured on an upper portion of the upper casing 3, a fan-driven gear 52 secured on the upper central shaft portion 421 of the radial-flow fan 42, a switching gear 53 operatively engageable with the fan-driven gear 52 and mounted in a gear holder 531 slidably held in an arcuate slot 511 formed in the upper cover 51 having a switch handle 532 protruding upwardly from the gear holder 531 for operatively engaging the switching gear 53 with the fan-driven gear 52 or disengaging the switching gear 53 from the fan-driven gear 52, a transmission gear means 54 having an upper large transmission gear 541 engageable with the switching gear 53 and a lower small transmission gear 542 formed on a lower end portion of the transmission gear means 54 engageable with a follower gear 66 of the air guiding funnel 6, and a positioning lock 55 having a latch 555 normally locking the switch handle 532 of the switching gear 53 for coupling the fan-driven gear 52 and the upper transmission gear 541, and operatively unlocking the switch handle 532 by retracting a knob 557 protruding upwardly from the lock 55 and retracting the latch 555 for uncoupling the upper transmission gear 541 from the fan-driven gear 52.

The air guiding funnel 6 includes: a funnel body 61 generally disposed around the radial-flow fan 42 having an upper flange 63 secured with the follower gear 66 engageable with the lower transmission gear 542 of the transmission gear set 5 and a lower flange 62 rotatably disposed around the upper shaft 411 defining an inlet passage 621 between the funnel 6 and the upper casing 3 for directing air and mosquitoes upwardly through the inlet passage 621 and an enlarged hood 641 radial expanded from the funnel body 61 defining an inlet port 64 disposed on a first opening of the radial-flow fan 42 and a contraction duct 651 protruding rearwardly from the enlarged hood 641 defining an outlet port 65 disposed on a second opening of the radial-flow fan 42 opposite to the inlet port 64.

The mosquito catcher 7 includes: a misquito-collecting net 71 formed with a fine mesh screen 711 thereon secured to the funnel body 61 of the air guiding funnel 6 and a side impacting plate 712 connected with the screen 711 rotatably slidably contacting the upper net 32 of the upper casing 3, a sloping plate 72 inclinedly secured to the air guiding funnel 6 in front of the mosquito-collecting net 71 defining a mosquito inlet slot 721 between the sloping plate 72 and the upper net 32 of the upper casing 3, and a mosquito collection box 73 formed on a lower portion of the catcher 7 for collecting any dead mosquitoes dropping from the catcher 7.

The switch means 8 includes at least a push button or switch 81 formed on a top portion of the cover 51, which can be depressed for controlling the power on or off for the fan 4, the lamp 2, etc.

In using the present invention, the motor 41 is powered to drive the axial-flow fan 43 to draft mosquito-laden air upwardly through the holes 131, 151, passage 621, and also drive the radial-flow fan 42 in a rotating direction R as shown in FIG. 2, the mosquitoes flying in an air stream blown by fan 42 will be directed through sloping plate 72 in direction M into the catcher 7 to be impacted against the impacting plate 712 and mosquito-collecting net 71 which are rotated in direction R' opposite to the fan direction R as driven by the gear set 5. The mosquitoes caught on net 711 will be dead as impacted by a strong air stream or wind against the rotation of fan 42 (direction R) or will be killed when impacted on the impacting plate 712. Another air stream enterring the inlet port 64 will be blown outwardly through the outlet port 65, which will be discharged outwardly in direction A for cooling an environment or room interior. The upper net 32 with fine mesh will prevent an escape of the mosquitoes sucked into the upper casing 3 from the lower casing 2 and will be caught by the catch 7. The dead mosquitoes will be collected into box 73 which may be removed by opening the door 33 formed on a lower portion of the upper casing 3.

The present invention applys a physical method for catching the mosquitoes sucked in an air stream exhausted by the fan 4, without using high-tension electric current for preventing an electrical shock accident.

Figure 6:
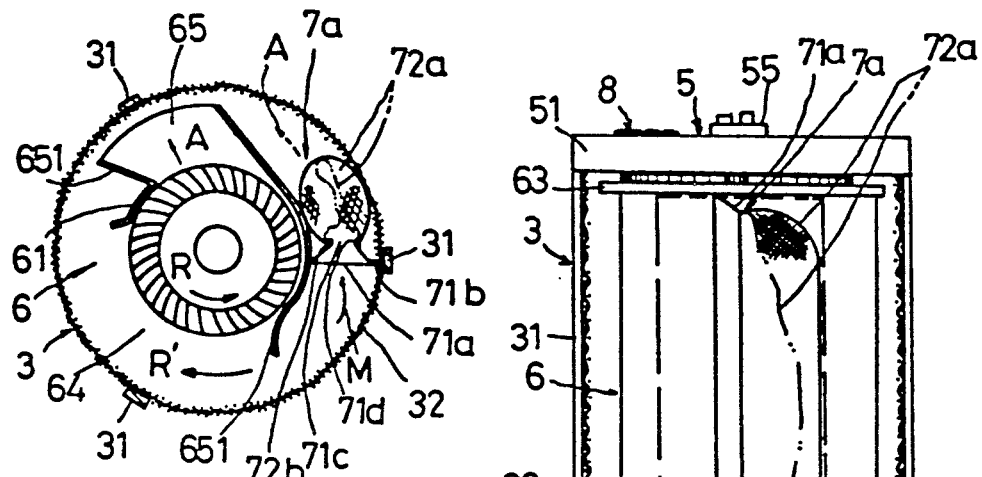
FIG. 6 is a top view sectional drawing of the present invention as shown in FIG. 5.

Another preferred embodiment of the present invention is shown in FIGS. 5, 6, in which the mosquito catcher 7 is modified to be a catching net 7a secured with the air guiding funnel 6 having an enlarged catcher hood 71a for guiding mosquito-laden air inwardly and an air penetratable collection bag 72a secured with the hood 71a for collecting mosquitoes passing through the hood 71a. The mosquitoes collected in the bag 72a will be dead as impacted by the blowing air driven by the fan 4.

The enlarged hood 71a includes an inner portion 71c secured to the funnel 6 and an outer impacting plate 71b slidably contacting the upper net 32 of the upper casing 3. The collection bag 72a may be a screen bag with air penetratable for filtering the caught mosquitoes off from the air stream A having a bag opening 72b secured to a bracket 71d formed on a venturi port 71c of the hood 71a.

The present invention may be suitably modified without departing from the spirit and scope of this invention.

The gear set 5 and switching gear 53 may be modified to be other clutch means (not shown). The catcher 7 may be made as a simple net or opened bag stably secured on a side wall of the upper casing 3 in contrast to a rotating radial-flow fan 42 for catching mosquitoes blown by the fan 42. The present invention is in no way limited to be the examples as hereinbefore shown and described.

I claim:

1. A mosquito-killing fan comprising:

a casing including a lower casing and an upper casing;

a fluorescent lamp mounted on a bottom portion of said casing operatively illuminated for guiding mosquitoes flying into said casing;

an air fan means including an axial-flow fan formed in said lower casing, and a radial-flow fan formed in said upper casing, both said fans driven by a driving motor rotatably secured in said casing; and a mosquito catcher operatively catching mosquito flying in an air stream blown by said air fan means driven by said driving motor;

said mosquito catcher secured to an air guiding funnel operatively driven by said radial-flow fan through a transmission gear set which includes: an upper cover secured on an upper portion of the upper casing, a fan-driven gear secured on an upper central shaft portion of the radial-flow fan, a switching gear operatively engageable with the fan-driven gear and mounted in a gear holder slidably held in an arcuate slot formed in the upper cover having a switch handle protruding upwardly from the gear holder for operatively engaging the switching gear with the fan-driven gear or disengaging the switching gear from the fan-driven gear, a transmission gear means having an upper large transmission gear engageable with the switching gear and a lower small transmission gear positioned below said upper large transmission gear and engageable with a follower gear of the air guiding funnel, and a positioning lock having a latch normally locking the switch handle of the switching gear for coupling the fan-driven gear and the upper transmission gear, and operatively unlocking the switch handle by retracting a knob protruding upwardly from the lock and retracting the latch for uncoupling the upper transmission gear from the fan-driven gear;

said air guiding funnel including: a funnel body generally disposed around the radial-flow fan having an upper flange secured with the follower gear and a lower flange rotatably disposed around an upper shaft of the driving motor defining an inlet passage between the funnel and the upper casing for directing air and mosquitoes upwardly through the inlet passage, an enlarged hood radially expanded from the funnel body defining an inlet port disposed on a first opening of the radial-flow fan and a contraction duct protruding rearwardly from the enlarged hood defining an outlet port disposed on a second opening of the radial-flow fan opposite to the inlet port of said funnel; and said mosquito catcher having: a mosquito-collecting net formed with a fine mesh screen thereon secured to the funnel body of the air guiding funnel and a side impacting plate connected with the fine mesh screen rotatably slidably contacting an upper net disposed around the upper casing, a sloping plate inclinedly secured to the air guiding funnel in front of the mosquito-collecting net defining a mosquito inlet slot between the sloping plate and the upper net of the upper casing, and a mosquito collection box formed on a lower portion of the catcher for collecting any dead mosquitoes dropping from the catcher.

* * * * *